June 9, 1964    J. RICHMAN    3,136,589
AIR BEARING
Filed March 6, 1963

INVENTOR.
JAY RICHMAN
BY
ATTORNEY

United States Patent Office 3,136,589
Patented June 9, 1964

3,136,589
AIR BEARING
Jay Richman, Philadelphia, Pa., assignor, by mesne assignments, to Pennsalt Chemicals Corporation, Philadelphia, Pa., a corporation of Pennsylvania
Filed Mar. 6, 1963, Ser. No. 263,168
3 Claims. (Cl. 308—9)

This invention relates to an air bearing, and more particularly, to vacuum apparatus wherein an element is supported with an air bearing.

When testing elements mounted for rotation, and disposed within an evacuated container, it has been proposed to provide an air bearing for the elements. An air bearing materially reduces friction thereby facilitating more accurate results during the testing procedure. Heretofore, the air or other gaseous fluid which forms the bearing was permitted to escape into the evacuated chamber. I have ascertained that such gaseous fluids interfere with the attainment of accurate testing results and increases the length of time needed to attain a specific pressure within the evacuated container.

In accordance with the present invention, a rotatably mounted element disposed within an evacuated container is provided with an air bearing which materially reduces the amount of gaseous medium permitted to escape into the evacuated container. This is accomplished by providing an evacuated annular groove or channel around the source of the gaseous medium providing the bearing thereby materially reducing the amount of the gaseous medium which is permitted to enter the evacuated container.

It is an object of the present invention to provide a novel air bearing.

It is another object of the present invention to provide a novel air bearing for an element disposed within an evacuated container.

It is another object of the present invention to provide an ultra-high vacuum system wherein an element disposed within an evacuated container is provided with an air bearing in a manner which materially reduces escape of the gaseous medium into the evacuated container.

Other objects will appear hereinafter.

For the purpose of illustrating the invention there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 an ultra-high vacuum system designated generally as 10.

Figure 1:
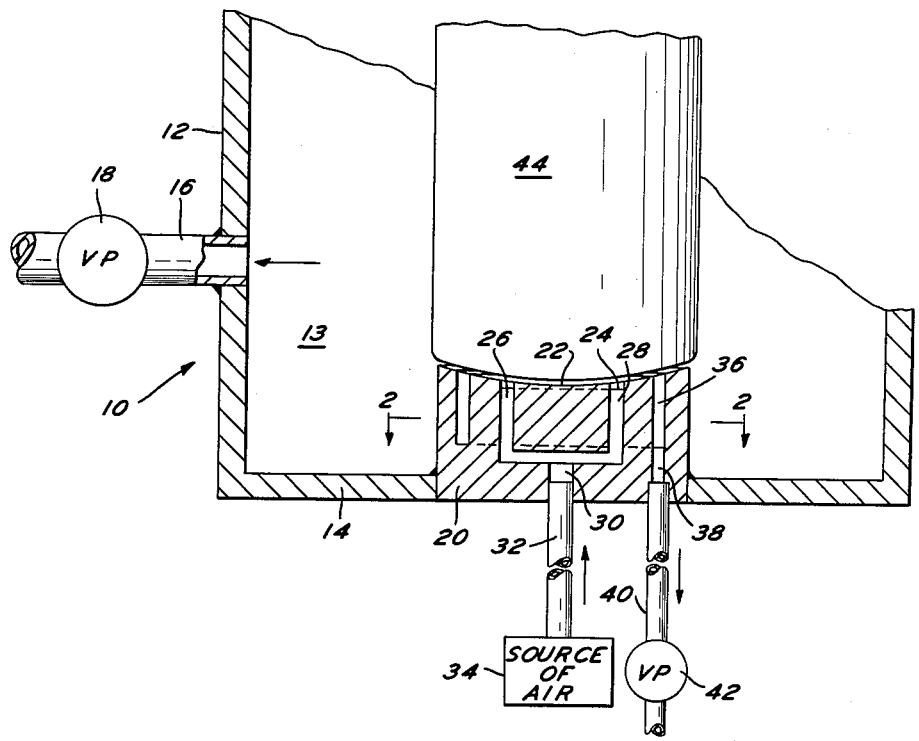
FIGURE 1 is a partial elevation view of the present invention with some elements illustrated in section.
Figure 2:
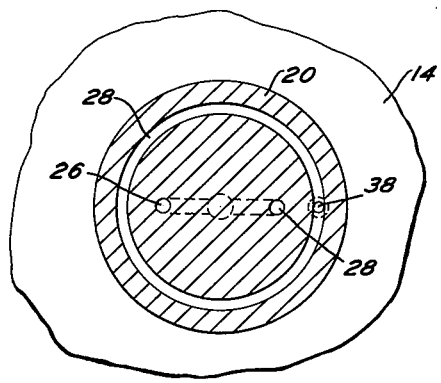
FIGURE 2 is a transverse sectional view taken along the lines 2—2 in FIGURE 1.

The system 10 includes an evacuated container 12 having a bottom wall 14. The container 12 is evacuated by means of a conduit 16 communicating with the chamber 13 inside the container 12. A vacuum pump 18 or the like is disposed in conduit 16.

The present invention is of general application and may be utilized in a wide variety of different ultra-high vacuum systems. Hence, the system 10 may be a laboratory device for testing and determining the effect on a rotatable member under evacuated conditions. Alternatively, the container 12 may be part of a system simulating conditions in outer space designed to determine the effect on a rotatable element which will be rotating in a substantial vacuum with minimum frictional resistance. The particular element which is rotatably supported, per se, forms no part of the present invention and may be any one of a wide variety of elements which are adapted to be rotated or otherwise moved under evacuated conditions.

A bearing mounting block 20 is fixedly secured in an opening in the bottom wall 14 of the container 12. The upper surface of the block 20 may be flat, convex, or concave as illustrated at 22. Alternatively, the surface 22 may be a combination of concave and flat surfaces. Surface 22 is provided with an annular groove 24.

Spaced axially extending passages 26 and 28 in block 20 communicate with the groove 24. If desired, groove 24 may be eliminated and the grooves 26 and 28 will then extend upwardly for a sufficient distance so that they intersect the surface 22. The lower end of passages 26 and 28 communicate with a central opening 30. Opening 30 is in direct communication with a conduit 32 which in turn is in communication with a source 34 of pressurized gaseous medium such as pressurized air.

The block 20 is provided with an annular channel 36 extending downwardly from the surface 22. The diameter and configuration of channel 36 is sufficient so that it surrounds the groove 24 and the points where passages 26 and 28 intersect the surface 22. The channel 36 is preferably of sufficient dimension so that it is positioned adjacent the outer periphery of block 20. As illustrated, block 20, channel 36 and groove 24 are circular. These elements may have other geometric configurations such as a square, rectangle, etc.

The depth of channel 36 is greater than the depth of groove 24. Channel 36 is in communication with conduit 40. Conduit 40 is provided with a vacuum pump 42 or the like for evacuating the channel 36. The source of gaseous medium 34 is preferably a substantially constant pressure so that the gaseous medium can suspend and support an element 44 in a manner so that the element 44 may rotate or move sideways as desired. In a typical embodiment, the gap between surface 22 and the juxtaposed surface on element 44 may be in the neighborhood of .001 inch.

The pressure in channel 36 will generally be higher than the pressure within the chamber 13. In order for the gaseous medium introduced through passages 26 and 28 to escape into the chamber 13, it must traverse the channel 36. The pressure in channel 36 is preferably maintained at a level which is one hundredth of the pressure of the gaseous medium supporting element 44. Thus, ninety-nine percent (99%) of the gaseous medium will be removed by way of channel 36 and conduit 40 with only one percent (1%) of the gaseous medium being permitted to escape into the chamber 13. Accordingly, the advantages of a gas bearing may be attained without the disadvantage of the gaseous medium being introduced into the evacuated chamber notwithstanding the fact that the gas bearing is disposed within the chamber.

The present invention may be embodied in other specific forms without departing from the spirit or essential attributes thereof and, accordingly, reference should be made to the appended claims, rather than to the foregoing specification as indicating the scope of the invention.

I claim:

1. In a vacuum system comprising a container, means for evacuating said container, an element disposed within said container, a gas bearing for said element, said gas bearing including a mounting block disposed at least partially within said container, said block having a surface within said container juxtaposed to a surface on said element, means for introducing a pressurized gas through said block to form a space between said surfaces, and means for substantially preventing the pressurized gas from escaping through the periphery of said space between said surfaces into said evacuated container.

2. In a system in accordance with claim 1 wherein said last mentioned means includes an annular channel in said block communicating with said surface on said block, and means for evacuating said channel so that the pressure in said channel is approximately one hundredth of the pressure of the gas in said space, and with the pressure in said channel being greater than the pressure within said chamber.

3. In a system in accordance with claim 1 wherein said surface on said block is concave and said surface on said element is convex, said element being mounted for rotation about its longitudinal axis, and the pressure of the gas within said space being sufficiently great to support said element.

References Cited in the file of this patent
UNITED STATES PATENTS
2,710,234    Hansen _____ June 7, 1955